United States Patent
Badin et al.

(10) Patent No.: US 9,870,341 B2
(45) Date of Patent: Jan. 16, 2018

(54) MEMORY REDUCTION METHOD FOR FIXED POINT MATRIX MULTIPLY

(71) Applicant: QUALCOMM Incorporated, San Diego, CA (US)

(72) Inventors: Matthew Leslie Badin, San Jose, CA (US); Nathan Whitehead, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 15/074,413

(22) Filed: Mar. 18, 2016

(65) Prior Publication Data

US 2017/0270073 A1   Sep. 21, 2017

(51) Int. Cl.
    *G06F 17/16*    (2006.01)
    *G06N 3/00*     (2006.01)

(52) U.S. Cl.
    CPC ............ *G06F 17/16* (2013.01); *G06N 3/00* (2013.01)

(58) Field of Classification Search
    None
    See application file for complete search history.

(56) References Cited

U.S. PATENT DOCUMENTS

| | | | | |
|---|---|---|---|---|
| 6,901,422 | B1* | 5/2005 | Sazegari | G06F 17/16 708/607 |
| 2003/0126176 | A1* | 7/2003 | Devir | G06F 17/16 708/520 |
| 2011/0153707 | A1* | 6/2011 | Ginzburg | G06F 9/3001 708/523 |
| 2014/0379774 | A1 | 12/2014 | Gupta et al. | |
| 2015/0170020 | A1 | 6/2015 | Garimella | |
| 2015/0234781 | A1* | 8/2015 | Angerer | G06F 17/12 708/446 |
| 2016/0026912 | A1 | 1/2016 | Falcon et al. | |
| 2017/0061279 | A1* | 3/2017 | Yang | G06N 3/084 |
| 2017/0270073 | A1* | 9/2017 | Badin | G06N 3/00 |

OTHER PUBLICATIONS

Gupta S., et al., "Deep Learning with Limited Numerical Precision," Feb. 9, 2015, 10 pages.
Savich A., et al., "A Low-Power Scalable Stream Compute Accelerator for General Matrix Multiply (GEMM)," VLSI 2013; Published Feb. 24, 2014, and Retrieved from the Internet URL: http://www.hindawi.com/journals/vlsi/2014/712085/, 8 pages.

(Continued)

*Primary Examiner* — David H Malzahn
(74) *Attorney, Agent, or Firm* — The Marbury Law Group PLLC

(57) ABSTRACT

Embodiments include computing devices, apparatus, and methods implemented by the apparatus for memory reduction for fixed point matrix multiply on a computing device. The computing device may implement a partial matrix multiplication using a first block of fixed point data of a first matrix and a second block of fixed point data of a second matrix using full precision resulting in a first intermediate result. The computing device may down convert the first intermediate result by converting fixed point data of the first intermediate result to fixed point data using lower precision resulting in a first down converted intermediate result.

30 Claims, 12 Drawing Sheets

(56) References Cited

OTHER PUBLICATIONS

Warden P., "Why are Eight Bits Enough for Deep Neural Networks?" May 23, 2015, 4 pages.
International Search Report and Written Opinion—PCT/US2017/017924—ISA/EPO—dated May 11, 2017.
Jiang J., et al., "Experimental Demonstration of the Fixed-Point Sparse Coding Performance", Cybernetics and Information Technologies, Jul. 23, 2014 (Jul. 23, 2014), XP055368709, vol. 14, No. 5, pp. 40-50, ISSN: 1311-9702, DOI: 10.2478/cait-2014-0042.

\* cited by examiner

MEMORY REDUCTION METHOD FOR FIXED POINT MATRIX MULTIPLY

BACKGROUND

Deep neural networks are used heavily on mobile devices for a variety of tasks, including scene detection, facial recognition, image sorting and labeling. Convolution is frequently used for deep neural networks to accomplish these tasks, and is usually implemented using matrix multiplication. Deep neural network models are trained for floating point computations. On mobile devices, deep neural network models, such as prediction models, are now also using fixed point computations. However, many implementations of deep neural network models using fixed point computations require use of extra amounts of memory that reduces performance speeds of the mobile device.

SUMMARY

The various embodiments include circuits and methods for memory reduction for fixed point matrix multiply on a computing device. Various embodiments may be implemented in circuitry and/or in a processor executing processor-executable instructions that perform operations including implementing a partial matrix multiplication using a first block of fixed point data of a first matrix and a second block of fixed point data of a second matrix using full precision resulting in a first intermediate result. The first intermediate result may then be down converted by converting fixed point data of the first intermediate result to fixed point data using lower precision resulting in a first down converted intermediate result.

Some embodiments may include storing the first down converted intermediate result, implementing a partial matrix multiplication using a third block of fixed point data of the first matrix and a fourth block of fixed point data of the second matrix using full precision resulting in a second intermediate result, in which the first block and the third block represent at least one complete row of the first matrix and the second block and the fourth block represent at least one complete column of the second matrix. The second intermediate result may be down converted by converting fixed point data of the second intermediate result to fixed point data using lower precision resulting in a second down converted intermediate result. The first down converted intermediate result added to the second down converted intermediate result using saturating addition capping a size of a resulting output portion of a resultant matrix to an output precision.

Some embodiments may include receiving the first block of fixed point data and the second block of fixed point data during a first time period, and receiving the third block of fixed point data and the fourth block of fixed point data during a second time period.

In some embodiments, down converting the first intermediate result may include determining a largest representable size of the first down converted intermediate result, retaining a retained portion of the first intermediate result equal in size to or smaller than the largest representable size of the first down converted intermediate result, and removing a discarded portion of the first intermediate result including a portion of the first intermediate result that does not fit in the largest representable size of the first down converted intermediate result.

In some embodiments, determining a largest representable size of the first down converted intermediate result may include determining an amount of memory available for storing the first down converted intermediate result.

Some embodiments may include performing a binary addition of 1 to a leftmost bit of the discarded portion of the first intermediate result, determining whether a result of the binary addition of 1 to the leftmost bit of the discarded portion of the first intermediate result results in a carry bit, and adding the carry bit to a right most bit of the retained portion of the first intermediate result in response to determining that the binary addition of 1 to the leftmost bit of the discarded portion of the first intermediate result results in a carry bit.

In some embodiments, down converting the first intermediate result may include down converting the first intermediate result using the lower precision equal to an output precision.

Some embodiments include a processor configured with processor-executable instructions to perform operations of one or more of the embodiment methods summarized above. Some embodiments include circuitry configured to perform operations of one or more of the embodiment methods summarized above.

Some embodiments include a computing device having means for performing functions of one or more of the embodiment methods summarized above.

Various embodiments may include a non-transitory processor-readable storage medium having stored thereon processor-executable instructions configured to cause a processor to perform operations of one or more of the embodiment methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a multi-core programmable processor. The term "computing device" may further refer to stationary computing devices including personal computers, desktop computers, all-in-one computers, work stations, super computers, mainframe computers, embedded computers, servers, home theater computers, and game consoles. While the various embodiments are particularly useful for mobile computing devices, such as smartphones, which have limited memory and battery resources, the embodiments are generally useful in any electronic device that implements a plurality of memory devices and a limited power budget in which reducing the power consumption of the processors can extend the battery-operating time of a mobile computing device.

Embodiments include methods, and systems and devices implementing such methods for reducing or eliminating the extra memory requirements of deep neural network models using fixed point computations. Embodiments include methods for blocking and rounding fixed point computations to simulate higher precision solutions without incurring the memory cost of the higher precision solution, thereby improving performance speed with minimal impact on the accuracy of the computation.

In fixed point neural networks, converting floating point to fixed point can be accomplished by direct conversion or scaling. For direct conversion, a required number of integer and fractional bits are calculated, and a number of bits for each is selected based on the desired performance. For scaling, all numbers are scaled to be positive integers in some range, and a bias is used to adjust where the range falls.

Figure 3A:
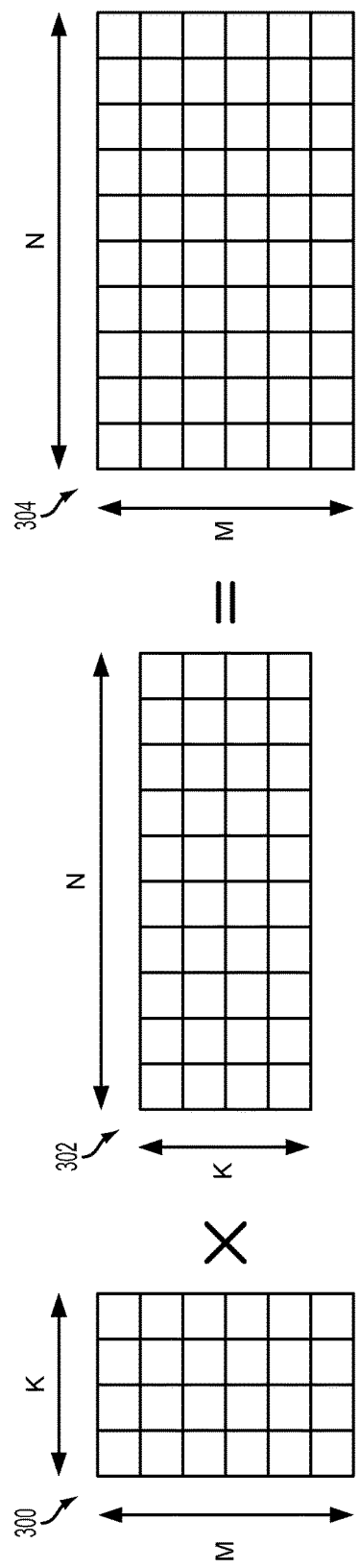
FIGS. 3A-3F are schematic diagrams illustrating an example matrix multiplication according to an embodiment.

When using scaling, the input is usually at a lower precision than the bias, and accumulation used to implement a matrix multiplication must be done at a much higher precision than the inputs or the outputs of the matrix multiplication. For example, each of an input and an output may be 8 bits, but the precision of the intermediate steps of the computation may be 32 bits, requiring down conversion of the output to 8 bits. Combining the higher precision requirements for fixed point computations over floating point computations and blocking techniques on processors to take advantage of cache for implementing the matrix multiplication requires the storing of partial intermediate results in memory because cache must be freed to complete the intermediate calculations. The amount of extra memory required for such operations depends upon the cache blocking size for M and N dimensions of the matrices being multiplied. This is illustrated in FIG. 3A and discussed in more detail below. Consequently, more memory is required, which reduces the performance/speed of the computing device.

Various embodiments and implementations enable reducing or eliminating the amount of memory required to store the intermediate results. The intermediate results may be produced by multiplying blocks of matrix A, defined by the cache blocking sizes for dimensions M and K, times blocks of matrix B, defined by the cache blocking sizes for dimensions K and N. The cache blocking sizes may be smaller than the dimensions M, K, and N. In an example, the dimension K may be a dimension of time, and the dimensions M and N may be dimensions of data size.

The matrix multiplication of the blocks of matrices A and B may be implemented using an accumulate function to add the results of multiplications of the individual elements of the matrices to produce the intermediate results. The multiplication and accumulation may be implemented for blocks of the matrices A and B, the size of the cache blocking size for dimensions K and M or N, using full precision. Whether preparing to produce an output portion of the matrix multiplication from the intermediate results or storing the intermediate results in the memory, the intermediate results may be down converted to a lower precision format. For example, the intermediate results may be down converted from 32 bit fixed point values to 16 bit fixed point values. The result of the conversion may be rounded or truncated to the nearest value representable in the lower precision format.

The down converted intermediate results of the matrix multiplication of a first set of blocks of the matrices A and B may be stored in memory for later use to complete the matrix multiplication using the down converted intermediate results of the matrix multiplication of a second set of blocks of the matrices A and B.

In order to produce the output from the intermediate results stored in memory, the intermediate results of the matrix multiplication of the first set and the second set of blocks of the matrices A and B may be added together using saturating addition, capping the values of the output to within a designated range.

The amount of additional memory needed to compute the fixed point matrix multiplications, which require intermediate values that are a higher precision that the inputs or the outputs, may be calculated using the equation:

$$\text{additional memory} = M\text{ block} * N\text{ block} * \text{intermediate precision size}.$$

Thus, after down converting the intermediate results, the intermediate precision size may reduce the amount of additional memory required as compared to full precision. Using an intermediate precision size equal to the output precision size may result in no additional memory requirement.

Figure 1:
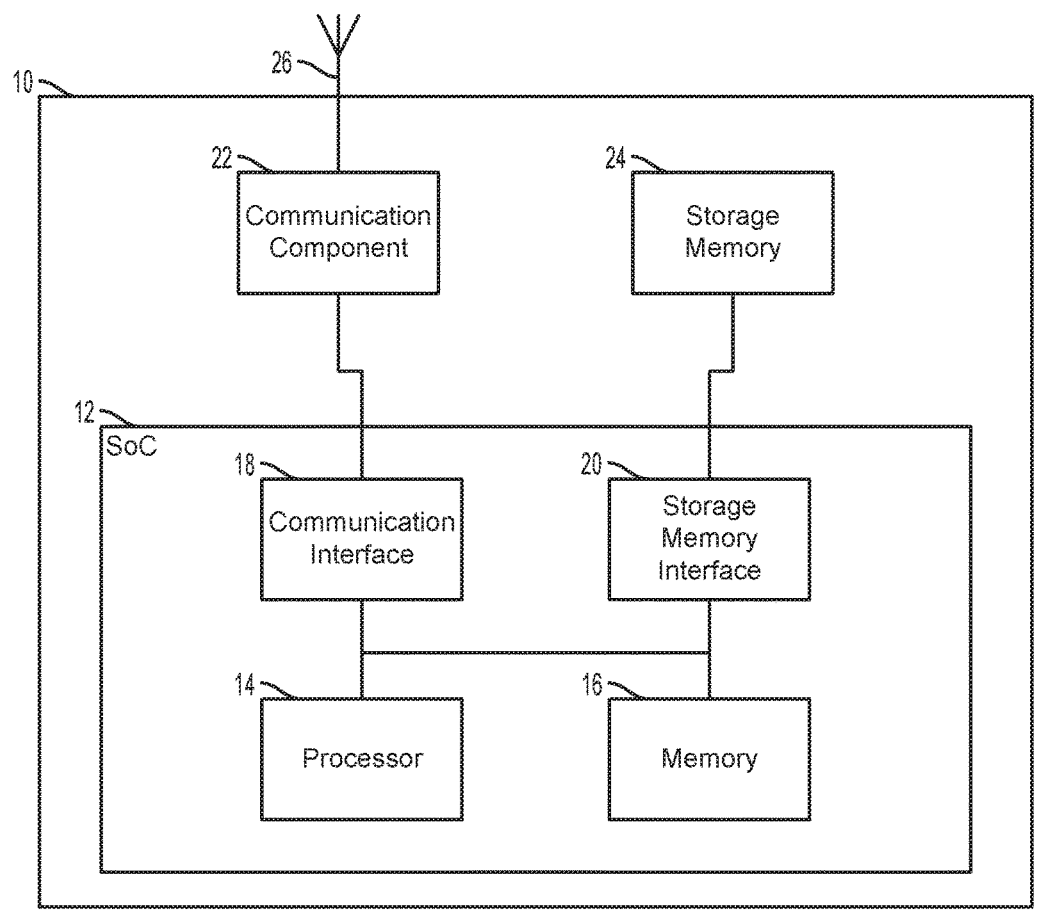
FIG. 1 is a component block diagram illustrating a computing device suitable for implementing an embodiment.

FIG. 1 illustrates a system including a computing device 10 configured to communicate with a remote computing device suitable for use with the various embodiments. The computing device 10 may include a system-on-chip (SoC) 12 with a processor 14, a memory 16, a communication interface 18, and a storage memory interface 20. The computing device 10 may further include a communication component 22 such as a wired or wireless modem, a storage memory 24, an antenna 26 for establishing a wireless communication link. The processor 14 may include any of a variety of hardware cores, for example a number of processor cores.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon. The SoC 12 may include one or more processors 14. The computing device 10 may include more than one SoCs 12, thereby increasing the number of processors 14 and processor cores. The computing device 10 may also include processors 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. In an embodiment, one or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a miss, because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

In an embodiment, the memory 16 may be configured to store raw data, at least temporarily, that is loaded to the memory 16 from a raw data source device, such as a sensor or subsystem. Raw data may stream from the raw data source device to the memory 16 and be stored by the memory until the raw data can be received and processed by a machine learning accelerator as discussed further herein with reference to FIGS. 3-19.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information even after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
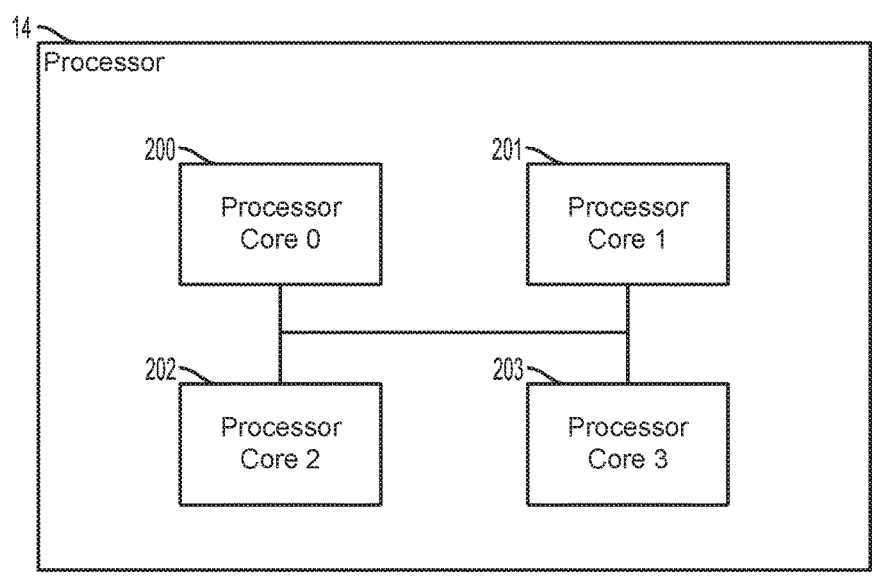
FIG. 2 is a component block diagram illustrating an example multi-core processor suitable for implementing an embodiment.

FIG. 2 illustrates a multi-core processor 14 suitable for implementing an embodiment. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, the SoC 12 may include a number of homogeneous or heterogeneous processors 14.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various embodiments to a four-core processor system. The computing device 10, the SoC 12, or the multi-core processor 14 may individually or in combination include fewer or more than the four processor cores 200, 201, 202, 203 illustrated and described herein.

FIGS. 3A-3F illustrate a non-limiting example of matrix multiplication according to an embodiment. This example matrix multiplication involves the multiplication, or dot product, of matrix A 300 with matrix B 302 to produce a resultant matrix 304.

The matrices 300, 302 may have independent dimensions M and N, each related to a respective cache blocking size designated for the respective matrix 300, 302. The matrices 300, 302 may have a shared dimension K, which, in an example, may be a dimension of time. For example, the dimension K may be related to the amount of time, or clock cycles, used in receiving input data for processing of matrix A 300. Thus, for matrix A 300 a computing device may retrieve, produce, or receive input data and represent the input data at any given time K as a column of matrix A 300 equal to the size of dimension M.

In executing the matrix multiplication, the computing device may produce or provide a set of weight factors represented as a row of matrix B 302 for the same time K as the corresponding column of matrix A 300. Thus, as time passes, the matrices 300, 302 may be built and traversed along the dimension K. The resultant matrix 304 may be of a size having dimensions M and N.

In some implementations, the cache blocking sizes for dimensions M, N, and K of the matrices 300, 302 may be smaller than the dimensions M, N, and K. The cache blocking sizes may be determined by an amount of cache designated or available for each dimension for executing the matrix multiplication. The cache blocking size may limit the amount of data from each of the matrices 300, 302 that may be stored to the cache during execution of the matrix multiplication. A cache blocking size for any of the dimensions M, N, and K may result in a multistep processes for executing the matrix multiplication.

Figure 3B:
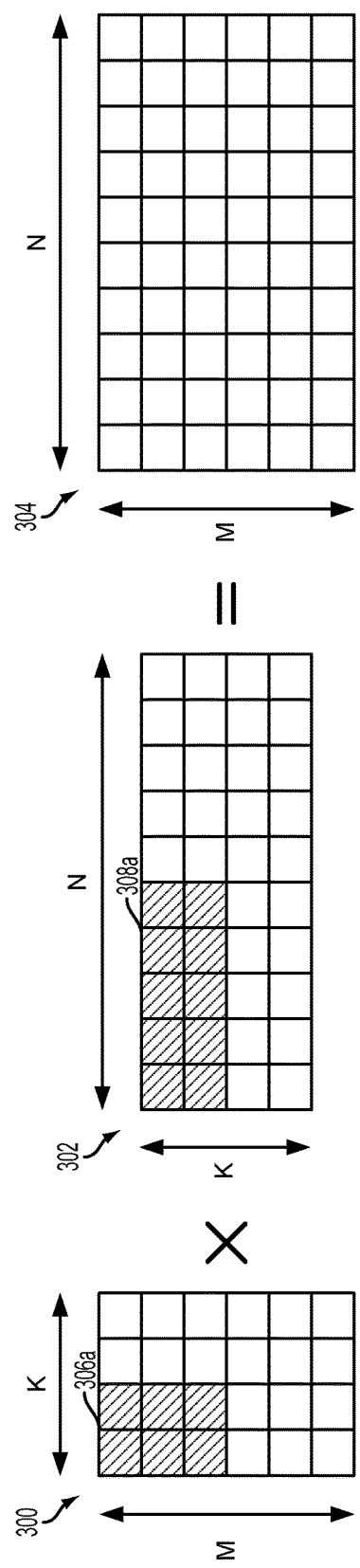

For example, in FIG. 3B, the portion 306a of matrix A 300 and the portion 308a of matrix B 302 indicate the cache blocking size for the dimensions of M, N, and K. For the matrix A 300, the cache blocking size for the dimension M may be 3 units, and the cache blocking size for dimension K may be two units. Similarly, for the matrix B 302, the cache blocking size for the dimension N may be 5 units, and the cache blocking size for the dimension K may be the same size for the cache blocking size for the dimension K for the matrix A 300, i.e. two units.

The units of the cache blocking sizes and of the dimensions M, N, K of matrices 300, 302 may be measured in a variety of units, including, bits, bytes, words, etc. The ratios of the cache blocking sizes for each dimension M, N, and K to the dimensions of M, N, and K are illustrated as a 2:1 ratio for ease and brevity of explanation. However, the ratios of the cache blocking sizes for each dimension M, N, and K, to the dimensions of M, N, and K, may be any ratio and may be the same or different from each other. Further, the data of the matrices 300, 302 may be formatted as floating point data.

Figure 3C:
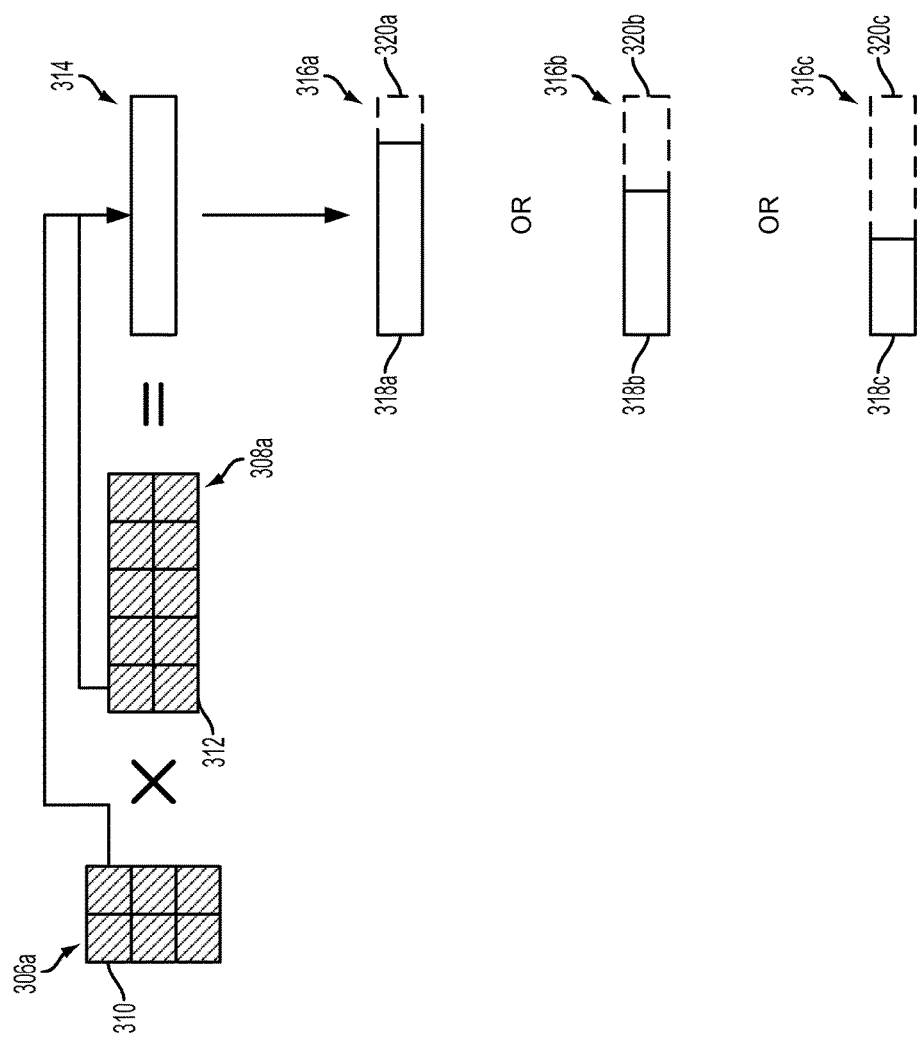

FIG. 3C illustrates an implementation of a partial matrix multiplication using the blocks 306a, 308a of matrices 300, 302, respectively. The blocks 306a, 308a of matrices 300, 302 may be stored in cache, and multiply and add/accumulate operations may use the information of the blocks 306a, 308a to implement the partial matrix multiplication.

The example in FIG. 3C illustrates one operation of the partial matrix multiplication showing the multiplication of row 310 of the block 306a times column 312 of the block 308a. Using common matrix multiplication techniques, each unit of the row 310 may be multiplied by a corresponding unit of the column 312, and results of the multiplication may be summed to produce the intermediate result 314 of the operation. The multiplication and addition/accumulation producing the intermediate result 314 may be implemented using full precision for fixed point data of the matrices 300, 302, converted from the floating point data of the matrices 300, 302. The intermediate result 314 may be larger than either of the row 310 and the column 312. Since the intermediate result 314 is a result of a partial matrix multiplication, the intermediate result may not be data that is ready to be output. In the example of FIG. 3, to be a completed portion of the output, the intermediate result is missing data from the rest of the rows of the matrix A 300 corresponding to the rows of the block 306a, and the rest of the columns of the matrix B 302 corresponding to the columns of the block 308a. Therefore, the intermediate result 314 must be stored.

The intermediate result 314 it may be down converted to a smaller sized fixed point value in order to reduce the amount of storage space required. The amount of additional memory needed to compute the matrix multiplications while converting from higher precision fixed point to lower precision fixed point may be calculated by the equation:

additional memory=*M* block**N* block*intermediate precision size.

Replacing the intermediate precision size with a smaller down converted intermediate precision size may reduce the amount of additional memory needed. In various implementations, the size reduction may be determined based on amounts of available cache memory or sizes of dedicated registers, and/or a specified level of accuracy. The smaller the size to which the intermediate result 314 is down converted, the higher the likelihood of an error in the data. Therefore, the size to which the intermediate result 314 is down converted may be balanced for performance and accuracy, or may favor one or the other in various applications. A down converted intermediate precision size equal to the size of an output precision for the matrix multiplication may eliminate the need for additional memory to store values, which may be down converted later from the fixed point intermediate result precision to a lower precision fixed point output.

To down convert the full precision, fixed point intermediate result 314, portions of the intermediate result 314 may be shifted off the lower end of the data to a representable size, based on the amount of space to store the intermediate result 314. A down converted intermediate result 316a, 316b, 316c may include a retained portion of the intermediate result 318a, 318b, 318c, which may remain after the shifting off of a discarded portion of the intermediate result 320a, 320b, 320c. The larger the available cache or register space, or the greater the specified accuracy, the larger the retained portion of the intermediate result 318a, 318b, 318c may be, and the smaller the discarded portion of the intermediate result 320a, 320b, 320c. Similarly, the smaller the available cache or register space, or the lesser the specified accuracy, the smaller the retained portion of the intermediate result 318a, 318b, 318c may be and the larger the discarded portion of the intermediate result 320a, 320b, 320c.

The down converted intermediate precision size may be the size of the retained portion of the intermediate result 318a, 318b, 318c. The down conversion may include shifting off the discarded portion of the intermediate result 320a, 320b, 320c, resulting in a truncated retained portion of the intermediate result 318a, 318b, 318c. The down conversion may further include rounding by adding to the leftmost bit of the discarded portion of the intermediate result 320a,

320b, 320c a binary bit set to "1". An addition of "0" and "1" may result in a value of "1," which may be discarded with the discarded portion of the intermediate result 320a, 320b, 320c, resulting in rounding the retained portion of the intermediate result 318a, 318b, 318c down. An addition of "1" and "1" may result in a value of "0" with a carry bit of "1". The "0" bit may be discarded with the discarded portion of the intermediate result 320a, 320b, 320c, and the carry bit of "1" may be added to the rightmost bit of the retained intermediate result 318a, 318b, 318c, resulting in rounding the retained portion of the retained intermediate result 318a, 318b, 318c up. Rounding may reduce an amount of error over only truncating the down converted intermediate results 316a, 316b, 316c.

Figure 3D:
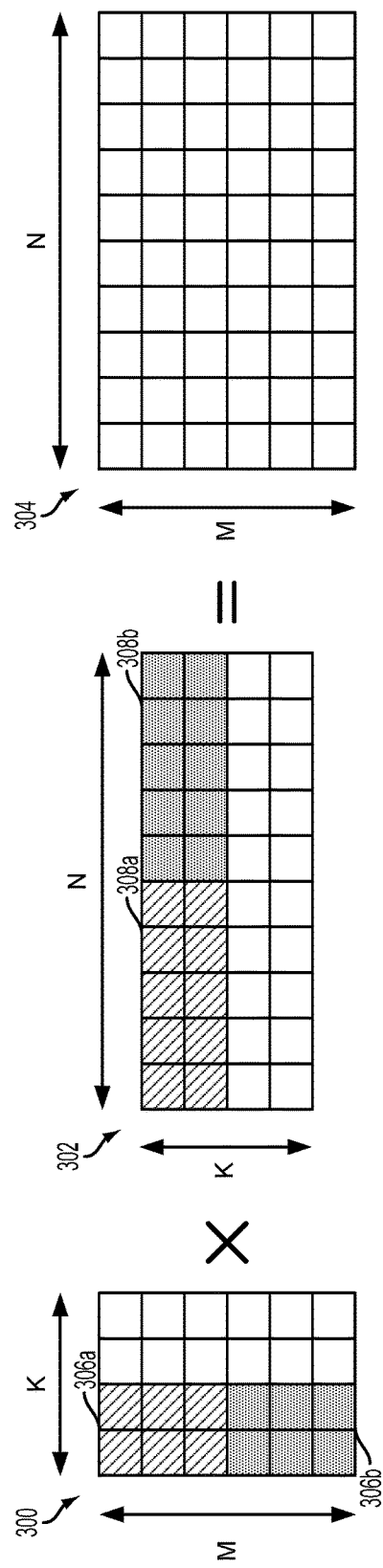

The process of partial matrix multiplication described herein may be repeated for the next available blocks 306b, 308b of the matrices 300, 302, respectively, as illustrated in FIG. 3D. The down converted intermediate results for the partial matrix multiplication of the next available blocks 306b, 308b may also be stored in available cache or dedicated registers.

Figure 3E:
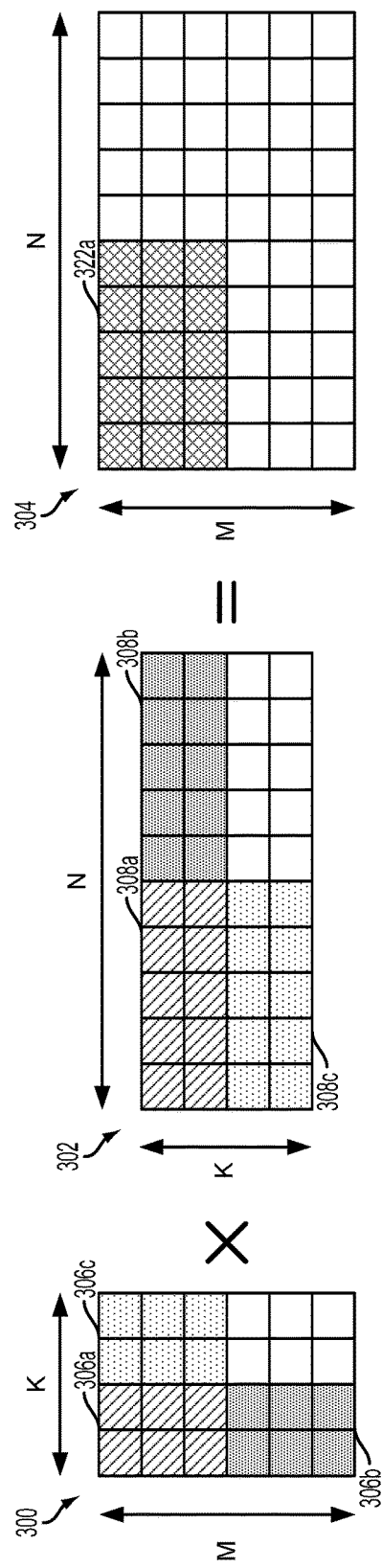

As illustrated in FIG. 3E, partial matrix multiplication may be implemented for available blocks 306c, 308c of the matrices 300, 302, respectively, as they become available. The down converted intermediate results for the partial matrix multiplication of the blocks 306c, 308c may also be stored in available cache or dedicated registers. The stored down converted intermediate results for the partial matrix multiplication of the blocks 306a, 306c, 308a, 308c may be combined using saturating addition. The resulting sum of the saturating addition of the down converted intermediate results for the partial matrix multiplication of the blocks 306a, 306c, 308a, 308c may produce the output portion 322a of the resultant matrix 304. The saturating addition may cap the size of the output portion 322a to maintain an output precision.

Figure 3F:
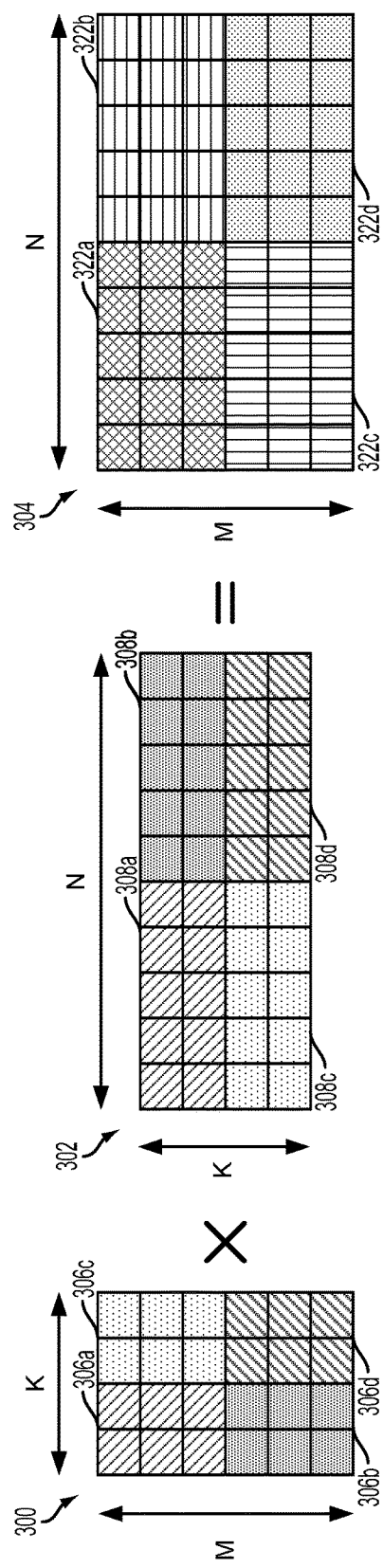

As illustrated in FIG. 3F, the remaining blocks 306d, 308d of the matrices 300, 302 may be operated on to implement the final implementation of the partial matrix multiplication for the matrix multiplication of the matrices 300, 302. The production of the down converted intermediate results from this final implementation of the partial matrix multiplication may provide the last down converted intermediate results to complete the resultant matrix 304 by implementing the saturating addition using the down converted intermediate results to produce the output portion 322b, 322c, 322d.

In various implementations, the saturating addition may be implemented upon the availability of down converted intermediate results combinable to produce an output portion of the resultant matrix 304. In various implementations, the saturating addition may be implemented upon the availability of all down converted intermediate results for the matrix multiplication. In various implementations, the output portions of the resultant matrix 304 may be produced in any order.

Figure 4:
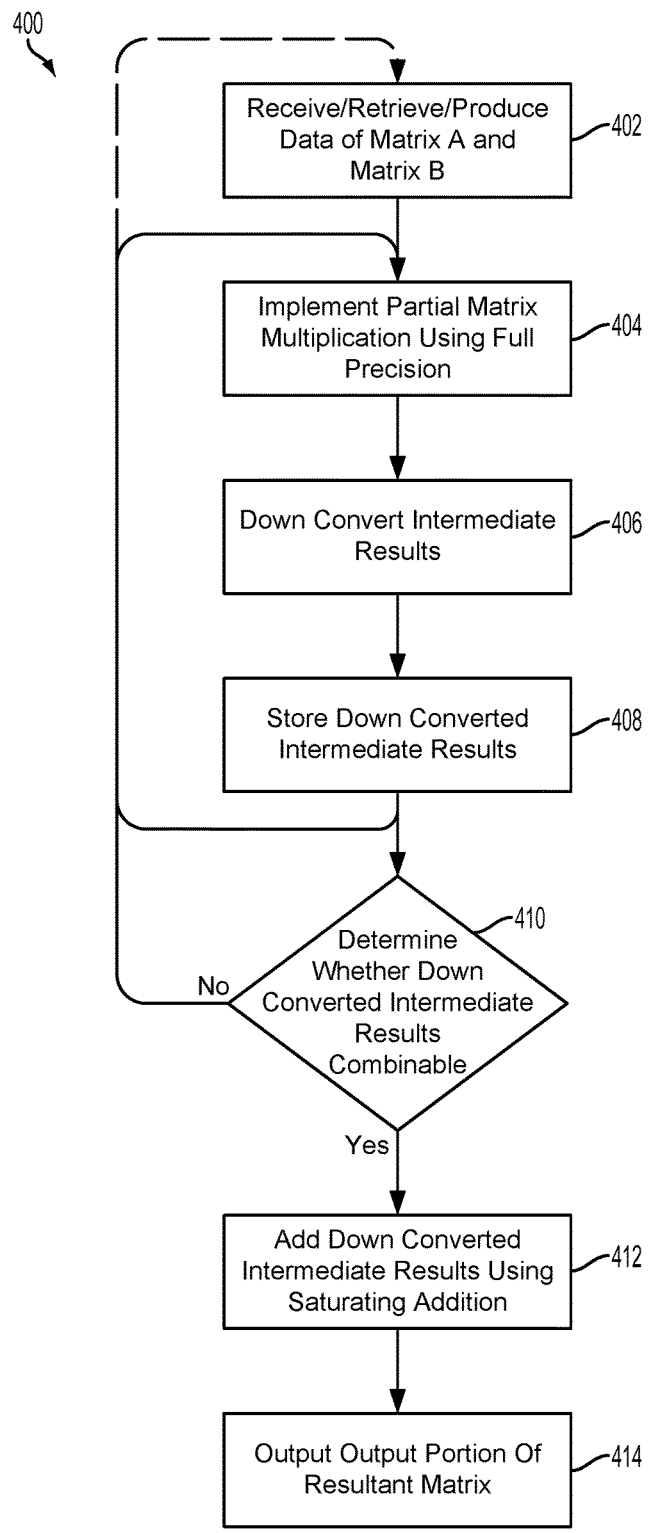
FIG. 4 is a process flow diagram illustrating method for implementing memory reduction for fixed point matrix multiply according to an embodiment.

FIG. 4 illustrates an embodiment method 400 for memory reduction for fixed point matrix multiply according to various embodiments. The method 400 may be implemented in a computing device in software executing in a processor (e.g., the processor 14 in FIGS. 1 and 2), in dedicated hardware or circuitry, or a combination of a processor and dedicated hardware, such as a processor executing software within a machine learning device that includes other individual components. In order to encompass the alternative configurations enabled in the various embodiments, the hardware implementing the method 400 is referred to herein as a "computing device."

In block 402, the computing device may receive, retrieve, or produce data for a matrix A and a matrix B. For example, the data of matrix A may include floating point input data for processing retrieved, produced, or received by the computing device at any given time K. For example, the data of matrix B may include a set of floating point weight factors received, produced, or received for the same time K. The floating point input data of matrix A and the floating point weight factors of matrix B may be converted to fixed point formats.

In block 404, the computing device may implement partial matrix multiplication for blocks of the data for matrix A and matrix B using full precision. The blocks of data may include one or more rows and columns of the matrices A and B, but less than all of the rows and columns of the matrices A and B. The number of rows and columns of the matrices A and B may be limited by the amount of cache space allocated for implementing matrix multiplication for the matrices A and B, and in particular the amount of space allocated for the rows of one of the matrices A and B, the columns of the other of the matrices A and B, and the rows or columns of the matrices A and B related to the time dimension K. The computing device may implement partial matrix multiplication in block 404 by implementing matrix multiplication for the blocks of matrices A and B using full precision so that each element of a resultant intermediate matrix is a fixed point intermediate result of the partial matrix multiplication in full precision.

In block 406, the computing device may down convert the fixed point intermediate results of the partial matrix multiplication in full precision to lower precision fixed point down converted intermediate results. An embodiment method 500 for down conversion of the fixed point intermediate results in full precision to lower precision fixed point down converted intermediate results is described below with reference to FIG. 5.

In block 408, the computing device may store the down converted intermediate results. The computing device may use dedicated cache space or dedicated registers for storing the down converted intermediate results. As described, the amount of space available for storing the down converted intermediate results may affect the precision of the down converted intermediate results. Also, the amount of space available for storing the down converted intermediate results may be correlated with a specified performance and/or accuracy. The more space made available to store the down converted intermediate results, the more accurate the result of the matrix multiplication, but the slower the performance for implementing the matrix multiplication. Similarly, the less space available to store the down converted intermediate results, the less accurate the result of the matrix multiplication, but the faster the performance for implementing the matrix multiplication.

The computing device may continue to implement partial matrix multiplication for blocks of the data for matrix A and matrix B using full precision in block 404, or receive, retrieve, and/or produce data for matrix A and matrix B in block 402.

Concurrently, in determination block 410, the computing device may determine whether the down converted intermediate results are combinable. To be combinable, the down converted intermediate results may be results of the partial matrix multiplications involving blocks representing at least a full row from one of matrix A and matrix B, and at least a full column from the other of matrix A and matrix B. As such, the down converted intermediate results may represent a full set of down converted intermediate results for a matrix multiplication of at least a full row of from one of matrix A and matrix B, and at least a full column from the other of matrix A and matrix B.

In response to determining that the down converted intermediate results are not combinable (i.e., determination block 410="No"), the computing device may continue to implement partial matrix multiplication for blocks of the data for matrix A and matrix B using full precision in block 404, or receive, retrieve, and/or produce data for matrix A and matrix B in block 402.

In response to determining that the down converted intermediate results are combinable (i.e., determination block 410="Yes"), the computing device may add the combinable down converted intermediate results using saturating addition in block 412. The saturating addition may be configured to cap the size of a resultant output portion of the resultant matrix to maintain an output precision. In block 414, the computing device may output the output portion of the resultant matrix.

Figure 5:
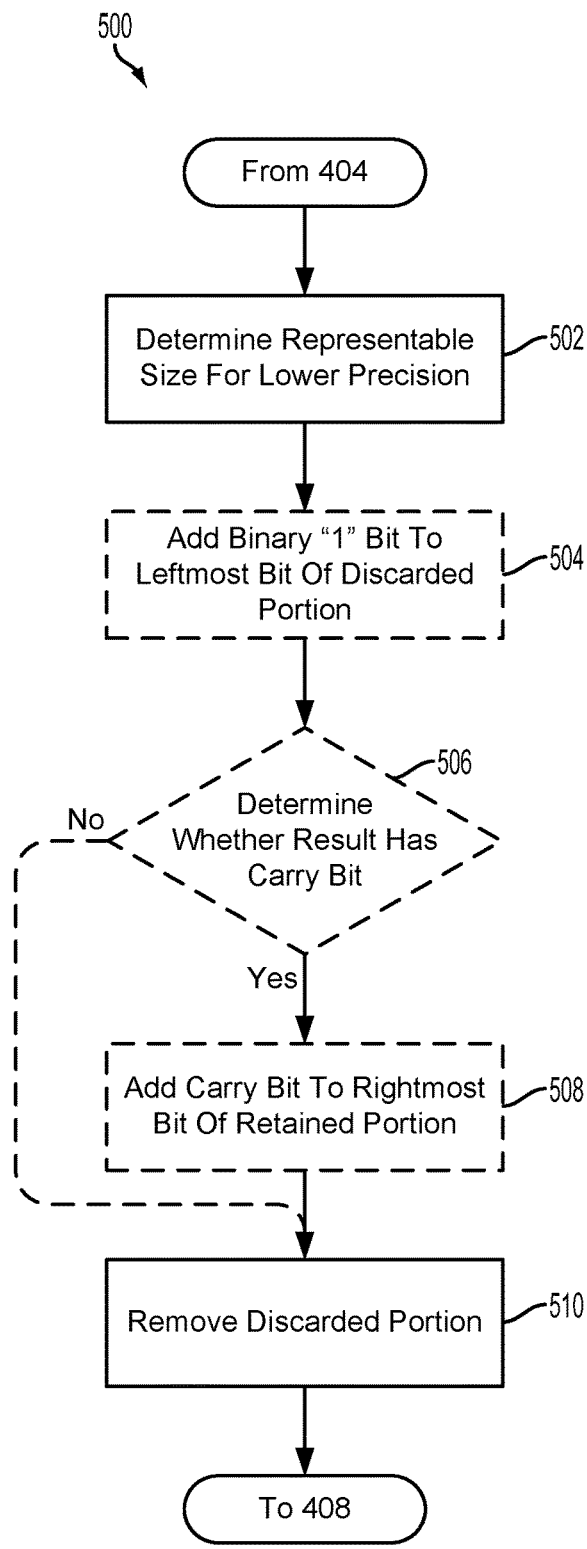
FIG. 5 is a process flow diagram illustrating method for implementing down converting intermediate results of a partial matrix multiply according to an embodiment.

FIG. 5 illustrates an embodiment method 500 for down converting intermediate results of a partial matrix multiply according to various embodiments. The method 500 may be implemented in a computing device in software executing in a processor (e.g., the processor 14 in FIGS. 1 and 2), in general purpose hardware, or dedicated hardware, such as a processor executing software within a machine learning device that includes other individual components. In order to encompass the alternative configurations enabled in the various embodiments, the hardware implementing the method 500 is referred to herein as a "computing device."

The method 500 may be implemented as part of the operations of block 406 described with reference to FIG. 4. In block 502, the computing device may determine a largest representable size for a lower precision down converted intermediate result. The representable size may depend on the amount of cache or register space dedicated for storing the down converted intermediate result. The amount of cache or register space dedicated for storing the down converted intermediate result may place a limit on the size of data stored therein, and the down converted intermediate result may be reduced in size to fit in the space of the cache or register. The down converted intermediate result may be divided into a retained portion of the down converted intermediate result and a discarded portion of the down converted intermediate result. The retained portion of the down converted intermediate result may include the largest representable size for a lower precision down converted intermediate result, and represent the portion of the intermediate result that may fit in the space of the cache or the register. The discarded portion of the down converted intermediate result may represent the portion of the intermediate result that may not fit in the space of the cache or the register.

In optional block 504, the computing device may round the largest representable size for a lower precision down converted intermediate result by adding a binary "1" bit to the leftmost bit of the discarded portion of the down converted intermediate result. An addition of "0" and "1" may result in a value of "1" which may be discarded with the discarded portion of the intermediate result, resulting in rounding the retained portion of the intermediate result down. An addition of "1" and "1" may result in a value of "0" with a carry bit of "1." The "0" bit may be may be discarded with the discarded portion of the intermediate result, and the carry bit of "1" may be added to the rightmost bit of the retained intermediate result, resulting in rounding the retained portion of the retained intermediate result. Rounding may reduce an amount of error over only truncating the down converted intermediate results.

In optional determination block 506, the computing device may determine whether the result of the addition of the binary "1" bit to the leftmost bit of the discarded portion of the down converted intermediate result, in optional block 504, results in a carry bit.

In response to determining that the addition of the binary "1" bit to the leftmost bit of the discarded portion of the down converted intermediate result, in optional block 504, results in a carry bit (i.e., optional determination block 506="Yes"), the computing device may add the carry bit to the rightmost bit of the retained portion of the retained intermediate result in optional block 508.

After adding the carry bit to the right most bit of the retained portion in optional block 508, or in response to determining that the addition of the binary "1" bit to the leftmost bit of the discarded portion of the down converted intermediate result, in optional block 504, does not result in a carry bit (i.e., optional determination block 506="No"), the computing device may remove the discarded portion of the down converted intermediate result in block 510. Removal of the discarded portion of the down converted intermediate result may be accomplished by shifting off the bits of the discarded portion of the down converted intermediate result.

Figure 6:
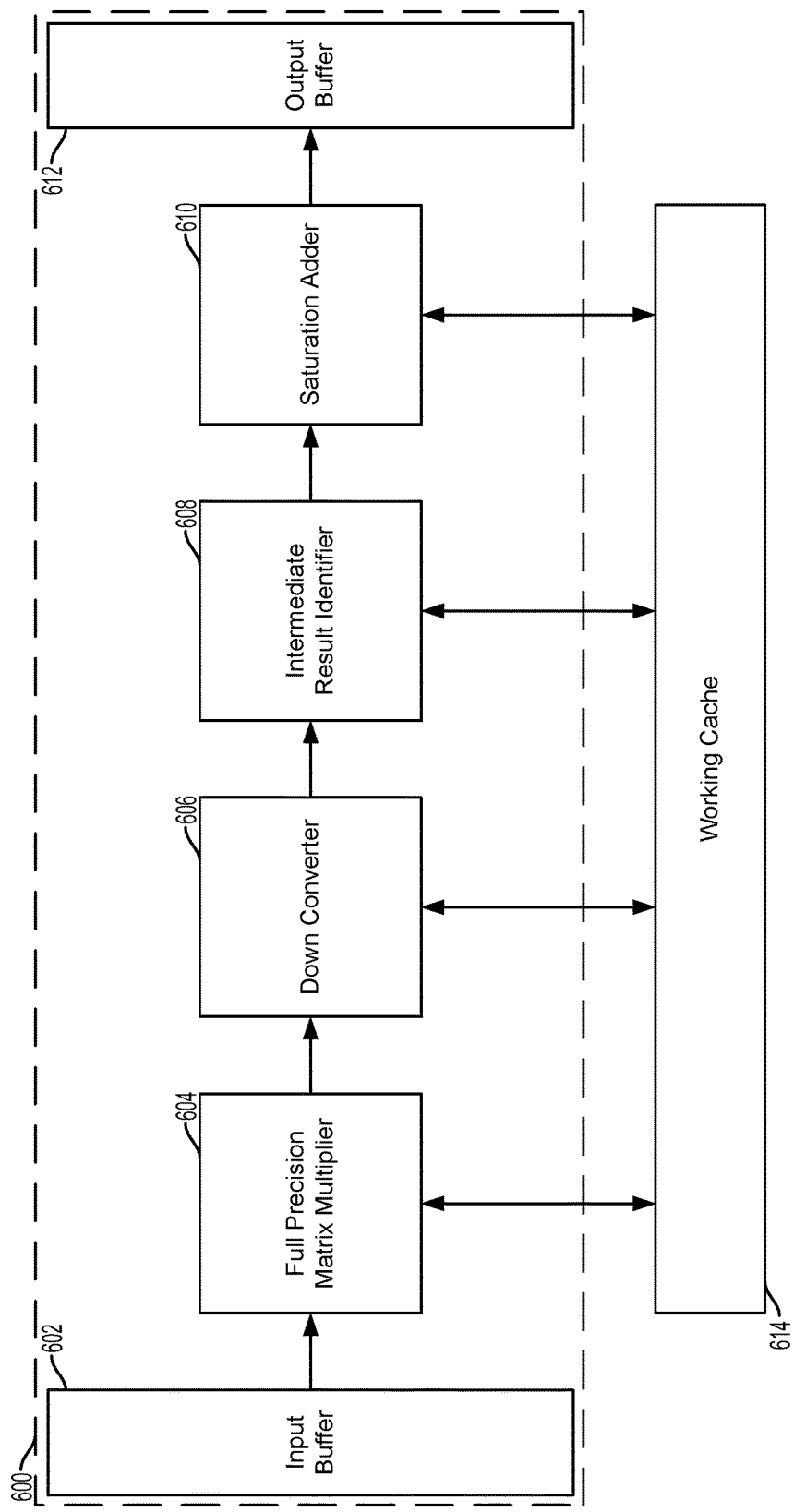
FIG. 6 is a component block diagram illustrating an example matrix multiply component according to an embodiment.

FIG. 6 illustrates an example matrix multiply component 600 for implementing the various embodiments in dedicated hardware (e.g., a circuit or hardware component). In various implementations, the matrix multiply component 600 may implement the method 400 described with reference to FIG. 4, and the method 500 described with reference to FIG. 5. The matrix multiply component 600 may be a hardware component or circuit that includes an input buffer 602, a full precision matrix multiplier 604, a down converter 606, an intermediate result identifier 608, a saturation adder 610, and an output buffer 612.

The input buffer 602 may be configured to receive portions of data of matrices for multiplication. The portions of data of the matrices representing all or a portion of a row or column of data of the matrices, such as the portions 306a-306d of matrix A 300 and the portions 308a-308d of matrix B 302 as described herein with reference to FIGS. 3A-3F. In various implementations, the input buffer 602 may be divided into portions designated for data of a specified matrix. In various implementations, multiple input buffers 602 may be implemented and designated for data of a specified matrix. The input buffer 602 may hold the portions of data until the full precision matrix multiplier 604 is ready to operate using the data portions held by the input buffer 602.

The full precision matrix multiplier 604 may be configured to execute multiplication and addition of the data portions to produce an intermediate result in full precision, such as the intermediate result 314 described with reference to FIG. 3C. The matrix multiplication implemented by the full precision matrix multiplier 604 may represent a portion of a larger matrix multiplication of all of the data of the matrices being multiplied.

The down converter 606 may be configured to down convert the intermediate result 314 to a lower precision relative to the full precision of the intermediate result 314. The down converter 606 may shift off portions of the intermediate result 314, such as the discarded portion of the intermediate result 320a-320c described with reference to FIG. 3C, and retain other portions of the intermediate result 314, such as the retained portion of the intermediate result 318a-318c described with reference to FIG. 3C. The down conversion may result in a down converted intermediate result of the nearest representable value, such as the truncated retained portion of the intermediate result 318a-318c. The down converter 606 may also round the retained portion of the intermediate result to produce the down converted intermediate result.

The down converted intermediate result may be stored in a portion of a cache memory, or a working cache 614, which may be a portion of the memory 16 described with reference to FIG. 1. The intermediate result identifier 608 may identify down converted intermediate results that may be combined to generate an output portion of the matrix multiplication, such as the output portion 322a-322d described with reference to FIGS. 3E and 3F. The intermediate result identifier 608 may retrieve the down converted intermediate results from the working cache 614. In other words, the intermediate result identifier 608 may retrieve the down converted intermediate results of the matrix multiplications of various portions of the matrices representing at least a full column of one of the matrices and a full row of the other matrix.

The saturation adder 610 may receive the combinable down converted intermediate results, and implement a saturation addition to produce an output portion. The output buffer 612 may retain results of the saturation addition until the output portion is complete so that a portion of the result matrix of the matrix multiplication may be constructed from the output portion.

In various implementations, the different components of the matrix multiply component 600 may store partially completed or completed execution results in the working cache 614 and retrieve the stored execution results in order to complete implementation of an ongoing task or new tasks. In various implementations, the different components of the matrix multiply component 600 may include dedicated buffers or registers for storing the execution results and may retrieve the execution results from the dedicated buffers or registers to complete implementation of an ongoing task or new tasks.

In various implementations, multiple matrix multiply components 600 may be implemented in a processor, System on Chip, or computing device to execute the matrix multiplication of multiple portions of the matrices in parallel. The down converted intermediate results from different matrix multiply components 600 may be used by other matrix multiply components 600 to produce an output portion related to data portions for which the matrix multiply components 600 produced a down converted intermediate result. For example, a first matrix multiply component 600 may produce a first down converted intermediate result for a first portion of a first column of data of a first matrix and a first portion of a first row of data of a second matrix. A second matrix multiply component 600 may produce a second down converted intermediate result for a second portion of the first column of data of the first matrix and a second portion of the first row of data of the second matrix. In order to complete the matrix multiplication for the first column of the first matrix and the first row of the second matrix, the first matrix multiply component 600 may use the first down converted intermediate result and the second down converted intermediate result to produce the output portion.

Figure 7:
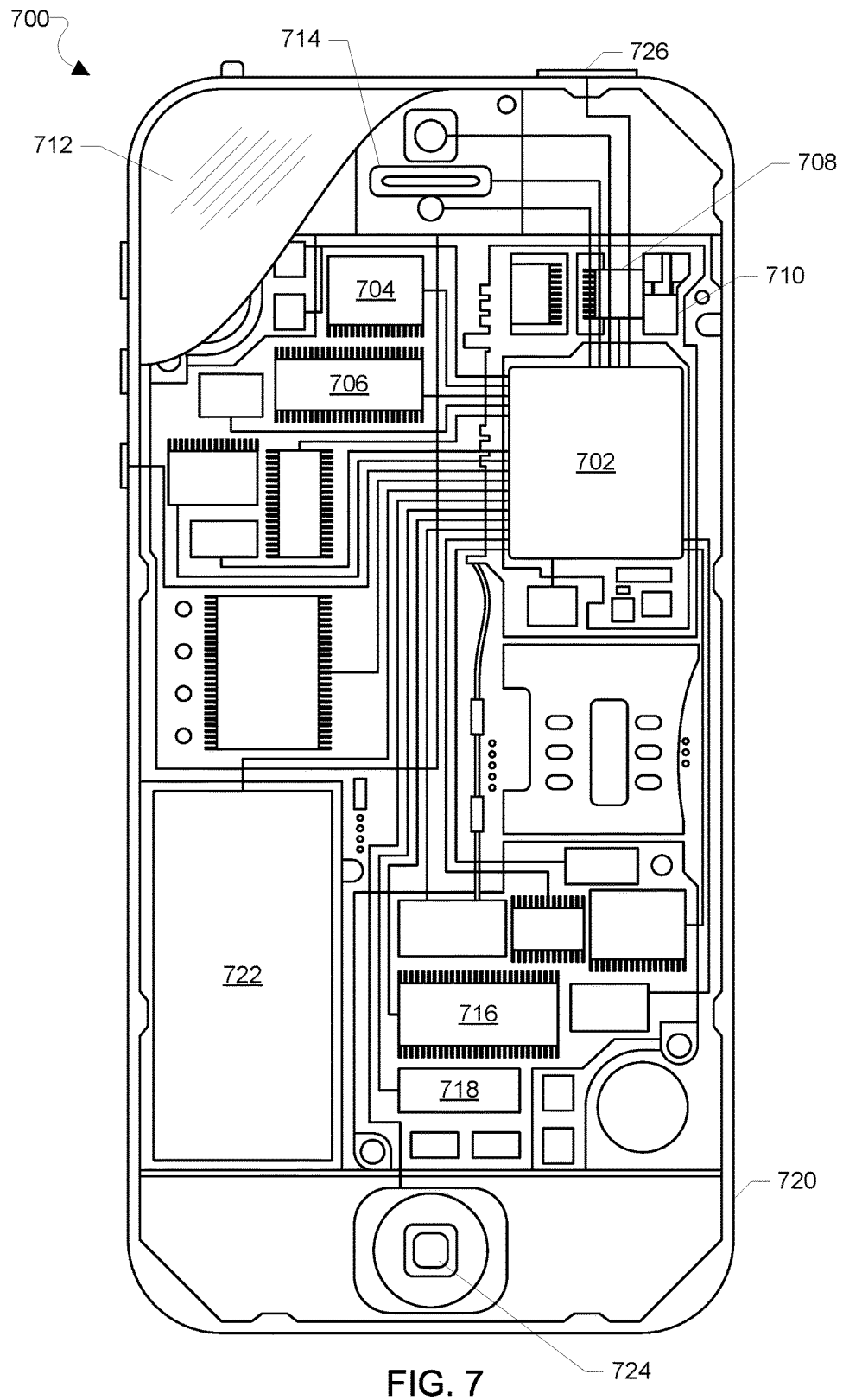
FIG. 7 is a component block diagram illustrating an example mobile computing device suitable for use with the various embodiments.

The various embodiments (including, but not limited to, embodiments discussed above with reference to FIGS. 1-6) may be implemented in processors and/or dedicated hardware in a wide variety of computing systems, which may include an example mobile computing device suitable for use with the various embodiments illustrated in FIG. 7. The mobile computing device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the computing device 700 need not have touch screen capability.

The mobile computing device 700 may have one or more radio signal transceivers 708 (e.g., Peanut, Bluetooth, Zigbee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

The mobile computing device 700 may also include speakers 714 for providing audio outputs. The mobile computing device 700 may also include a housing 720, constructed of a plastic, metal, or a combination of materials, for containing all or some of the components discussed herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

Figure 8:
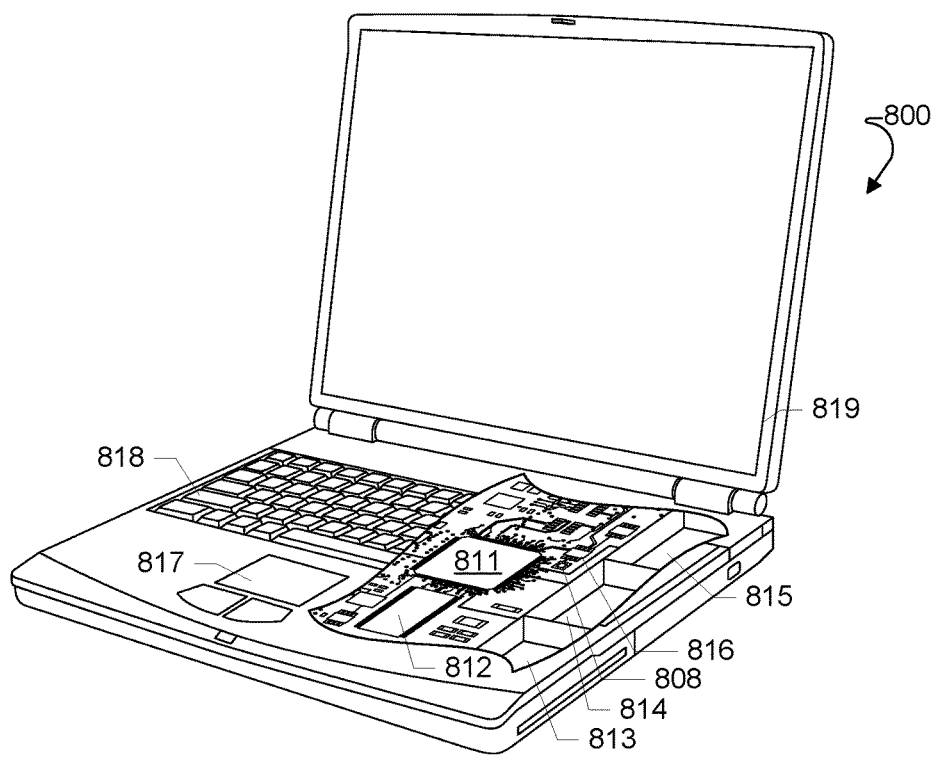
FIG. 8 is a component block diagram illustrating an example mobile computing device suitable for use with the various embodiments.

The various embodiments (including, but not limited to, embodiments discussed above with reference to FIGS. 1-6) may be implemented in processors and/or dedicated hardware in a wide variety of computing systems, which may include a variety of mobile computing devices, such as a laptop computer 800 illustrated in FIG. 8. Many laptop computers include a touchpad touch surface 817 that serves as the computer's pointing device, and thus may receive drag, scroll, and flick gestures similar to those implemented on computing devices equipped with a touch screen display and described above. A laptop computer 800 will typically include a processor 811 coupled to volatile memory 812 and a large capacity nonvolatile memory, such as a disk drive 813 of Flash memory. Additionally, the computer 800 may have one or more antenna 808 for sending and receiving electromagnetic radiation that may be connected to a wireless data link and/or cellular telephone transceiver 816 coupled to the processor 811. The computer 800 may also include a floppy disc drive 814 and a compact disc (CD) drive 815 coupled to the processor 811. In a notebook configuration, the computer housing includes the touchpad 817, the keyboard 818, and the display 819 all coupled to the processor 811. Other configurations of the computing device may include a computer mouse or trackball coupled to the processor (e.g., via a universal serial bus (USB) input) as are well known, which may also be used in conjunction with the various embodiments.

Figure 9:
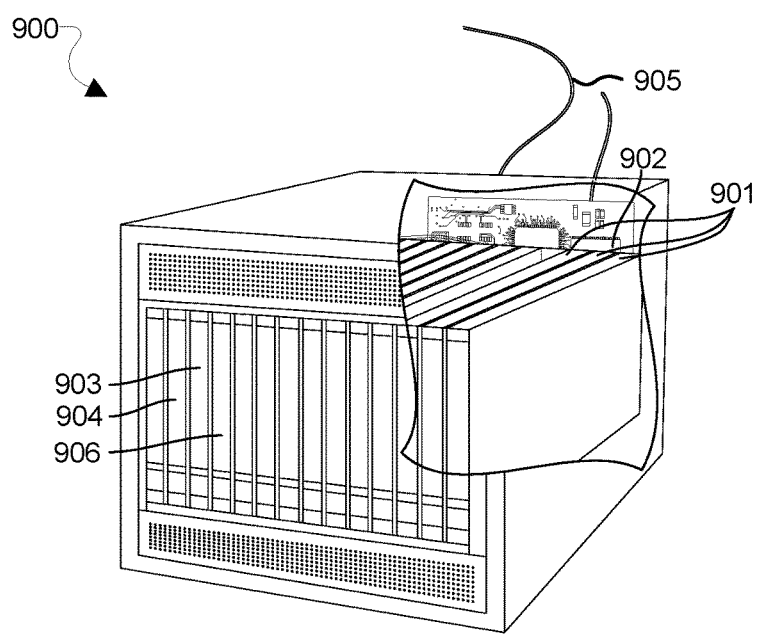
FIG. 9 is a component block diagram illustrating an example server suitable for use with the various embodiments.

The various embodiments (including, but not limited to, embodiments discussed above with reference to FIGS. 1-6) may be implemented in processors and/or dedicated hardware in a wide variety of computing systems, which may include any of a variety of commercially available servers for compressing data in server cache memory. An example server 900 is illustrated in FIG. 9. Such a server 900 typically includes one or more multi-core processor assemblies 901 coupled to volatile memory 902 and a large capacity nonvolatile memory, such as a disk drive 904. As illustrated in FIG. 9, multi-core processor assemblies 901 may be added to the server 900 by inserting them into the racks of the assembly. The server 900 may also include a floppy disc drive, compact disc (CD) or digital versatile disc (DVD) disc drive 906 coupled to the processor 901. The server 900 may also include network access ports 903 coupled to the multi-core processor assemblies 901 for establishing network interface connections with a network 905, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of memory reduction for fixed point matrix multiply on a computing device, comprising:
    determining a largest representable size of a down converted intermediate result configured to use less memory than an intermediate result;
    implementing a partial matrix multiplication using a first block of fixed point data of a first matrix and a second block of fixed point data of a second matrix using full precision resulting in a first intermediate result, wherein the first block represents a first portion of at least one complete row of the first matrix and the second block represents a second portion of at least one complete column of the second matrix;
    down converting the first intermediate result by converting fixed point data of the first intermediate result to fixed point data using lower precision equal in size to or smaller than the largest representable size resulting in a first down converted intermediate result;
    storing the first down converted intermediate result;
    implementing a partial matrix multiplication using a third block of fixed point data of the first matrix and a fourth block of fixed point data of the second matrix using full precision resulting in a second intermediate result, wherein the third block represents a third portion of the at least one complete row of the first matrix and the fourth block represent a fourth portion of the at least one complete column of the second matrix;
    down converting the second intermediate result by converting fixed point data of the second intermediate result to fixed point data using lower precision equal in size to or smaller than the largest representable size resulting in a second down converted intermediate result; and
    adding the first down converted intermediate result and the second down converted intermediate result.

2. The method of claim 1,
    where in adding the first down converted intermediate result and the second down converted intermediate result comprises adding the first down converted intermediate result and the second down converted intermediate result using saturating addition capping a size of a resulting output portion of a resultant matrix to an output precision.

3. The method of claim 1, further comprising:
    receiving the first block of fixed point data and the second block of fixed point data during a first time period; and
    receiving the third block of fixed point data and the fourth block of fixed point data during a second time period.

4. The method of claim 1, wherein determining the largest representable size of a down converted intermediate result comprises determining an amount of memory available for storing a down converted intermediate result.

5. The method of claim 1, wherein down converting the first intermediate result comprises:
    retaining a retained portion of the first intermediate result equal in size to or smaller than the largest representable size of the first down converted intermediate result; and
    removing a discarded portion of the first intermediate result including a portion of the first intermediate result that does not fit in the largest representable size of the first down converted intermediate result.

6. The method of claim 5, further comprising:
    performing a binary addition of 1 to a leftmost bit of the discarded portion of the first intermediate result;
    determining whether a result of the binary addition of 1 to the leftmost bit of the discarded portion of the first intermediate result results in a carry bit; and
    adding the carry bit to a right most bit of the retained portion of the first intermediate result in response to determining that the binary addition of 1 to the leftmost bit of the discarded portion of the first intermediate result results in a carry bit.

7. The method of claim 1, wherein down converting the first intermediate result comprises down converting the first intermediate result using the lower precision equal to an output precision.

8. A matrix multiply component configured for memory reduction for fixed point matrix multiply and configured to:
    determine a largest representable size of a down converted intermediate result configured to use less memory than an intermediate result;
    implement a partial matrix multiplication using a first block of fixed point data of a first matrix and a second block of fixed point data of a second matrix using full precision resulting in a first intermediate result, wherein the first block represents a first portion of at least one complete row of the first matrix and the second block represents a second portion of at least one complete column of the second matrix;
    down convert the first intermediate result by converting fixed point data of the first intermediate result to fixed point data using lower precision equal in size to or smaller than the largest representable size resulting in a first down converted intermediate result;
    store the first down converted intermediate result;
    implement a partial matrix multiplication using a third block of fixed point data of the first matrix and a fourth block of fixed point data of the second matrix using full precision resulting in a second intermediate result, wherein the third block represents a third portion of the at least one complete row of the first matrix and the fourth block represent a fourth portion of the at least one complete column of the second matrix;
    down convert the second intermediate result by converting fixed point data of the second intermediate result to fixed point data using lower precision equal in size to or smaller than the largest representable size resulting in a second down converted intermediate result; and
    add the first down converted intermediate result and the second down converted intermediate result.

9. The matrix multiply component of claim 8, wherein the matrix multiply component is configured
    add the first down converted intermediate result and the second down converted intermediate result by adding the first down converted intermediate result and the second down converted intermediate result using saturating addition capping a size of a resulting output portion of a resultant matrix to an output precision.

10. The matrix multiply component of claim 8, wherein the matrix multiply component is further configured to:
    receive the first block of fixed point data and the second block of fixed point data during a first time period; and
    receive the third block of fixed point data and the fourth block of fixed point data during a second time period.

11. The matrix multiply component of claim 8, wherein the matrix multiply component is configured to determine a largest representable size of a down converted intermediate result by determining an amount of memory available for storing the a down converted intermediate result.

12. The matrix multiply component of claim 8, wherein the matrix multiply component is configured to down convert the first intermediate result by:
    retaining a retained portion of the first intermediate result equal in size to or smaller than the largest representable size of the first down converted intermediate result; and
    removing a discarded portion of the first intermediate result including a portion of the first intermediate result that does not fit in the largest representable size of the first down converted intermediate result.

13. The matrix multiply component of claim 12, wherein the matrix multiply component is further configured to:
    perform a binary addition of 1 to a leftmost bit of the discarded portion of the first intermediate result;
    determine whether a result of the binary addition of 1 to the leftmost bit of the discarded portion of the first intermediate result results in a carry bit; and
    add the carry bit to a right most bit of the retained portion of the first intermediate result in response to determining that the binary addition of 1 to the leftmost bit of the discarded portion of the first intermediate result results in a carry bit.

14. The matrix multiply component of claim 8, wherein the matrix multiply component is configured to down convert the first intermediate result by down converting the first intermediate result using the lower precision equal to an output precision.

15. The matrix multiply component of claim 8, wherein the matrix multiply component comprises a processor configured with processor-executable instructions to:
    implement the partial matrix multiplication using the first block of fixed point data of the first matrix and the second block of fixed point data of the second matrix using full precision resulting in the first intermediate result; and
    down convert the first intermediate result by converting fixed point data of the first intermediate result to fixed point data using lower precision resulting in the first down converted intermediate result.

16. The matrix multiply component of claim 8, wherein the matrix multiply component comprises:
    a full precision matrix multiplier configured to implement the partial matrix multiplication using the first block of fixed point data of the first matrix and the second block of fixed point data of the second matrix using full precision resulting in the first intermediate result; and
    a down converter configured to down convert the first intermediate result by converting fixed point data of the first intermediate result to fixed point data using lower precision resulting in the first down converted intermediate result.

17. A matrix multiply component configured for memory reduction for fixed point matrix multiply, comprising:
    means for determining a largest representable size of a down converted intermediate result configured to use less memory than an intermediate result;
    means for implementing a partial matrix multiplication using a first block of fixed point data of a first matrix and a second block of fixed point data of a second matrix using full precision resulting in a first intermediate result, wherein the first block represents a first portion of at least one complete row of the first matrix and the second block represents a second portion of at least one complete column of the second matrix;
    means for down converting the first intermediate result by converting fixed point data of the first intermediate result to fixed point data using lower precision equal in size to or smaller than the largest representable size resulting in a first down converted intermediate result;
    means for storing the first down converted intermediate result;
    means for implementing a partial matrix multiplication using a third block of fixed point data of the first matrix and a fourth block of fixed point data of the second matrix using full precision resulting in a second intermediate result, wherein the third block represents a third portion of the at least one complete row of the first matrix and the fourth block represent a fourth portion of the at least one complete column of the second matrix;
    means for down converting the second intermediate result by converting fixed point data of the second intermediate result to fixed point data using lower precision equal in size to or smaller than the largest representable size resulting in a second down converted intermediate result; and
    means for adding the first down converted intermediate result and the second down converted intermediate result.

18. The matrix multiply component of claim 17, wherein means for adding the first down converted intermediate result and the second down converted intermediate result comprises means for adding the first down converted intermediate result and the second down converted intermediate result using saturating addition capping a size of a resulting output portion of a resultant matrix to an output precision.

19. The matrix multiply component of claim 17, further comprising:
    means for receiving the first block of fixed point data and the second block of fixed point data during a first time period; and
    means for receiving the third block of fixed point data and the fourth block of fixed point data during a second time period.

20. The matrix multiply component of claim 17, wherein means for determining a largest representable size of a down converted intermediate result comprises means for determining an amount of memory available for storing a down converted intermediate result.

21. The matrix multiply component of claim 17, wherein means for down converting the first intermediate result comprises:
    means for retaining a retained portion of the first intermediate result equal in size to or smaller than the largest representable size of the first down converted intermediate result; and
    means for removing a discarded portion of the first intermediate result including a portion of the first intermediate result that does not fit in the largest representable size of the first down converted intermediate result.

22. The matrix multiply component of claim 21, further comprising:
    means for performing a binary addition of 1 to a leftmost bit of the discarded portion of the first intermediate result;
    means for determining whether a result of the binary addition of 1 to the leftmost bit of the discarded portion of the first intermediate result results in a carry bit; and
    means for adding the carry bit to a right most bit of the retained portion of the first intermediate result in response to determining that the binary addition of 1 to the leftmost bit of the discarded portion of the first intermediate result results in a carry bit.

23. The matrix multiply component of claim 17, wherein means for down converting the first intermediate result comprises means for down converting the first intermediate result using the lower precision equal to an output precision.

24. A non-transitory processor-readable storage medium having stored thereon processor-executable instructions configured to cause a processor of a computing device to perform operations comprising:
   determining a largest representable size of a down converted intermediate result configured to use less memory than an intermediate result;
   implementing a partial matrix multiplication using a first block of fixed point data of a first matrix and a second block of fixed point data of a second matrix using full precision resulting in a first intermediate result, wherein the first block represents a first portion of at least one complete row of the first matrix and the second block represents a second portion of at least one complete column of the second matrix;
   down converting the first intermediate result by converting fixed point data of the first intermediate result to fixed point data using lower precision equal in size to or smaller than the largest representable size resulting in a first down converted intermediate result;
   storing the first down converted intermediate result;
   implementing a partial matrix multiplication using a third block of fixed point data of the first matrix and a fourth block of fixed point data of the second matrix using full precision resulting in a second intermediate result, wherein the third block represents a third portion of the at least one complete row of the first matrix and the fourth block represent a fourth portion of the at least one complete column of the second matrix;
   down converting the second intermediate result by converting fixed point data of the second intermediate result to fixed point data using lower precision equal in size to or smaller than the largest representable size resulting in a second down converted intermediate result; and
   adding the first down converted intermediate result and the second down converted intermediate result.

25. The non-transitory processor-readable storage medium of claim 24, wherein the stored processor-executable instructions are configured to cause the processor to perform operations
   such that adding the first down converted intermediate result and the second down converted intermediate result comprises adding the first down converted intermediate result and the second down converted intermediate result using saturating addition capping a size of a resulting output portion of a resultant matrix to an output precision.

26. The non-transitory processor-readable storage medium of claim 24, wherein the stored processor-executable instructions are configured to cause the processor to perform operations further comprising:
   receiving the first block of fixed point data and the second block of fixed point data during a first time period; and
   receiving the third block of fixed point data and the fourth block of fixed point data during a second time period.

27. The non-transitory processor-readable storage medium of claim 24, wherein the stored processor-executable instructions are configured to cause the processor to perform operations such that determining a largest representable size of a down converted intermediate result comprises determining an amount of memory available for storing a down converted intermediate result.

28. The non-transitory processor-readable storage medium of claim 24, wherein the stored processor-executable instructions are configured to cause the processor to perform operations such that down converting the first intermediate result comprises:
   retaining a retained portion of the first intermediate result equal in size to or smaller than the largest representable size of the first down converted intermediate result; and
   removing a discarded portion of the first intermediate result including a portion of the first intermediate result that does not fit in the largest representable size of the first down converted intermediate result.

29. The non-transitory processor-readable storage medium of claim 28, wherein the stored processor-executable instructions are configured to cause the processor to perform operations further comprising:
   performing a binary addition of 1 to a leftmost bit of the discarded portion of the first intermediate result;
   determining whether a result of the binary addition of 1 to the leftmost bit of the discarded portion of the first intermediate result results in a carry bit; and
   adding the carry bit to a right most bit of the retained portion of the first intermediate result in response to determining that the binary addition of 1 to the leftmost bit of the discarded portion of the first intermediate result results in a carry bit.

30. The non-transitory processor-readable storage medium of claim 24, wherein the stored processor-executable instructions are configured to cause the processor to perform operations such that down converting the first intermediate result comprises down converting the first intermediate result using the lower precision equal to an output precision.

* * * * *